US012224586B2

(12) United States Patent
Ghassempour Aghamolki et al.

(10) Patent No.: US 12,224,586 B2
(45) Date of Patent: Feb. 11, 2025

(54) ADAPTIVE PERSISTENCE FORECASTING FOR CONTROL OF DISTRIBUTED ENERGY RESOURCES

(71) Applicant: Eaton Intelligent Power Limited, Dublin (IE)

(72) Inventors: Hossein Ghassempour Aghamolki, Edina, MN (US); Arun Sukumaran Nair, Denver, CO (US); Abhinandan Tripathi, Kannauj (IN); David Wu Ganger, Lakewood, CO (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 361 days.

(21) Appl. No.: 17/728,177

(22) Filed: Apr. 25, 2022

(65) Prior Publication Data

US 2023/0344225 A1    Oct. 26, 2023

(51) Int. Cl.
*H02J 3/00* (2006.01)
*G05B 13/04* (2006.01)

(52) U.S. Cl.
CPC ............ *H02J 3/003* (2020.01); *G05B 13/048* (2013.01); *H02J 2203/20* (2020.01)

(58) Field of Classification Search
CPC ...... H02J 3/003; H02J 2203/20; G05B 13/048
See application file for complete search history.

(56) References Cited

U.S. PATENT DOCUMENTS

| 6,577,962 | B1* | 6/2003 | Afshari | G06Q 10/06 |
| | | | | 700/291 |
| 2010/0153035 | A1* | 6/2010 | Gautam | G06Q 30/0283 |
| | | | | 702/62 |
| 2016/0283844 | A1* | 9/2016 | Jones | G05D 23/1917 |
| 2019/0067946 | A1* | 2/2019 | Pan | G06Q 50/06 |

OTHER PUBLICATIONS

Dong Shi, "Analysis of the Relationship between Load Profile and Weather Condition", Jul. 27-31, 2014, IEEE PES General Meeting | Conference & Exposition (Year: 2014).*

* cited by examiner

*Primary Examiner* — Christopher W Carter
(74) *Attorney, Agent, or Firm* — Talem IP Law, LLP

(57) ABSTRACT

A method of adaptive persistence forecasting includes receiving historical load values for a site with at least one component that consumes energy; receiving historical temperature values corresponding to dates of the historical load values; evaluating the historical load values and the historical temperature values to determine a correlation coefficient; determining that there exists at least a threshold correlation between a load activity and temperature for the historical load values and the historical temperature values based on the correlation coefficient; in response to determining that there exists at least the threshold correlation, normalizing the historical load values based on a set temperature; and applying an adaptive seasonal persistence model to the normalized historical load values to output a forecast for use in controlling energy resources at the site.

18 Claims, 9 Drawing Sheets

ADAPTIVE PERSISTENCE FORECASTING FOR CONTROL OF DISTRIBUTED ENERGY RESOURCES

BACKGROUND

Distributed Energy Resources (DER) generally refer to any resource on a distribution system that produces electricity. DER often include natural gas, wind, solar, battery, and demand response resources; whereas coal and nuclear energy tend to be considered conventional resources.

Managing the variability aspect of DER on a power grid is one area of interest due to DER becoming an increasing presence on an electric system. Accurate forecasts of expected usage needs are needed for both energy planning and operation. System level or delivery point load forecasting is used for managing capacity and energy requirements, but as DER resources are added to distribution systems, forecasting at the bus or substation level is becoming more important.

BRIEF SUMMARY

Adaptive persistence forecasting for control of distributed energy resources is provided. A short-term load forecasting module is described that can work at different aggregation levels, prediction horizon, and granularity. Advantageously, fewer computing resources are needed as compared to machine learning-based forecasting (e.g., using neural-network), enabling forecasting at the bus or substation level.

A method of adaptive persistence forecasting includes receiving historical load values for a site with at least one component that consumes energy; receiving historical temperature values corresponding to dates of the historical load values; evaluating the historical load values and the historical temperature values to determine a correlation coefficient; determining that there exists at least a threshold correlation between a load activity and temperature for the historical load values and the historical temperature values based on the correlation coefficient; in response to determining that there exists at least the threshold correlation, normalizing the historical load values based on a set temperature; and applying an adaptive seasonal persistence model to the normalized historical load values to output a forecast for use in controlling energy resources at the site. The forecast can be rescaled from the normalized scale to return the output to scale.

A system performing the described method of adaptive persistence forecasting can be a single board computer. In some cases, the system can be a programmable logic controller that functions as a site-level controller with forecasting capabilities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Adaptive persistence forecasting for control of distributed energy resources is provided. A short-term load forecasting module is described that can work at different aggregation levels, prediction horizon, and granularity. Advantageously, fewer computing resources are needed as compared to machine learning-based forecasting (e.g., using neural network), enabling forecasting at the bus or substation level.

As mentioned above, DER generally refers to any resource on a distribution system that produces electricity. DER often include natural gas, wind, solar, battery, and demand response resources. Terms used in describing DER and their locations include the following.

Distribution generation (DG) includes one or more generating units at a single location owned and/or operated by a distribution utility or a merchant utility.

Behind the Meter Generation (BTMG) includes one or more generating units at a single location on a customer's side of a retail meter that serves all or part of the customer's retail load with electrical energy.

Energy Storage Facility (ES) includes one or more energy storage devices at a single location on either the utility side or the customer's side of the retail meter. ES can be any of various technology types, including electric vehicle charging stations.

DER aggregation (DERA) refers to a virtual resource formed by aggregating multiple DG, BTMG, or ES devices at different points of interconnection on a distribution system. A Bulk Electric System may model a DERA as a single resource at its "virtual" point of interconnection even though individual DER of the DERA may be located elsewhere.

Microgrid refers to an aggregation of multiple DER types behind the customer meter at a single point of interconnection that has the capability to island. A microgrid may range in size and complexity from a single "smart" building to a university campus or industrial/commercial park.

Cogeneration refers to the production of electricity from steam, heat, or other forms of energy produced as a by-product of another process.

Back-Up generation (BUG) includes one or more generating units at a utility side of a customer retail meter that serve in times of emergency at locations.

Forecasting is one of the most important operations in the safe and stable operation of a power system. The increasing percentage of DERs have made it even more challenging for the utilities to schedule their generation sources. An accurate forecasting model is essential for both energy planning and operation. Depending on the utility needs the forecast horizon and data granularity will be different. Load forecasting can work at different aggregation levels. System level or delivery point load forecasting is used for managing capacity and energy requirements, but as DER resources are added to distribution systems, forecasting at the bus or substation level will become more important.

Figure 1:
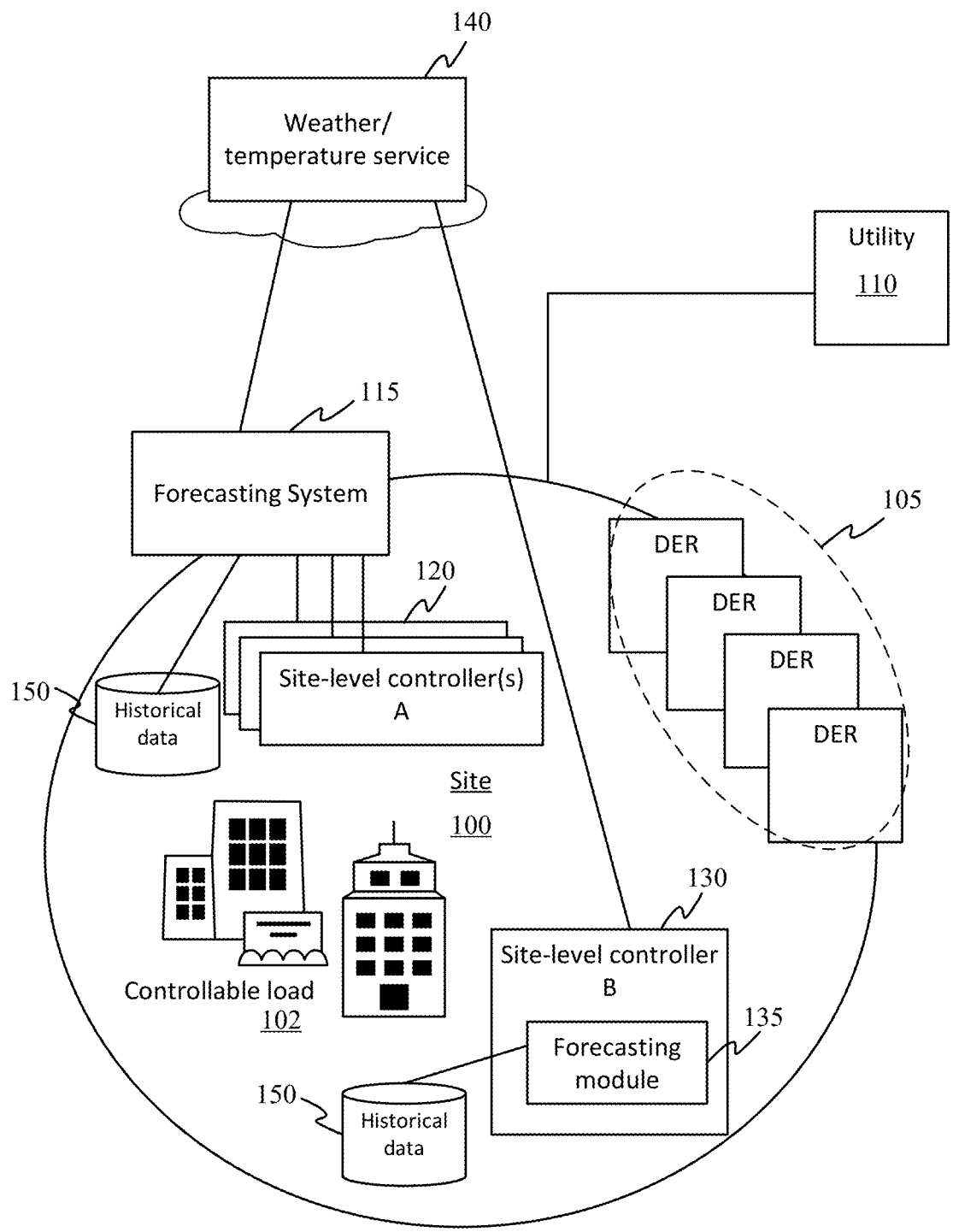
FIG. 1 illustrates an example operating environment with adaptive persistence forecasting for control of distributed energy resources.

FIG. 1 illustrates an example operating environment with adaptive persistence forecasting for control of distributed energy resources.

Referring to FIG. 1, a site 100 with a controllable load 102 (e.g., with powered buildings, equipment, etc.) can be on a microgrid utilizing DER 105 and power from a utility 110. The DER 105 can be controlled using one or more site-level controllers with adaptive persistence forecasting as described herein. For example, a forecasting system 115 that is local/on-site 100, remote, or cloud-based may be used to provide forecasting as described herein to one or more site-level controllers 120. Advantageously, the forecasting system 115 can be located at a bus or substation level. In some cases, instead of a forecasting system 115 that is separate from a site-level controller, a site-level controller 130 can include a forecasting module 135 (implemented in hardware and/or software) for performing the described forecasting.

The forecasting system 115 and/or site-level controllers (e.g., site-level controller B 130 with forecasting module 135) can communicate with a weather/temperature service 140 to obtain information about current, historical, and forecasted weather/temperature as needed. In addition, the forecasting system 115 and/or site-level controllers (e.g., site-level controller B 130 with forecasting module 135) can communicate with or include a storage resource 150 storing historical load data (e.g., the load at a particular date/time). In some cases, the forecasting system 115 and/or site-level controllers (e.g., site-level controller B 130 with forecasting module 135) communicates with various resources via application programming interfaces (APIs), for example, weather/temperature information can be obtained via communication with a weather API such as available from OpenWeatherMap, Dark Sky, Tomorrow.io (formerly ClimaCell), and the National Weather Service.

Figure 4:
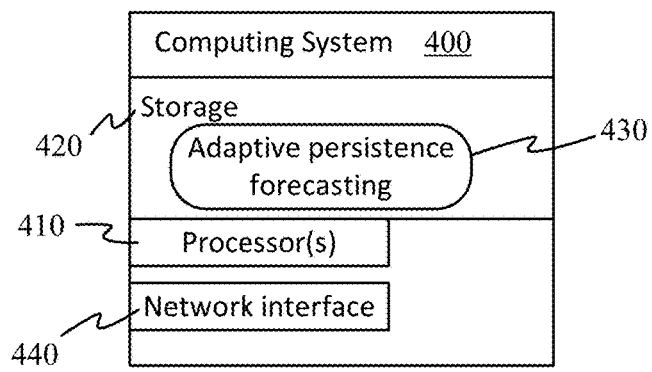
FIG. 4 illustrates a representation of a forecasting system.

In one implementation, the forecasting system 115 is implemented as a computing system such as illustrated in FIG. 4. In some cases, forecasting system 115 is a single board computer (a single circuit board with microprocessor(s), memory, input/output and other features often without connectors or slots). The single board computer configuration can be embedded within another device or may be used in rackmount format.

Figure 5:
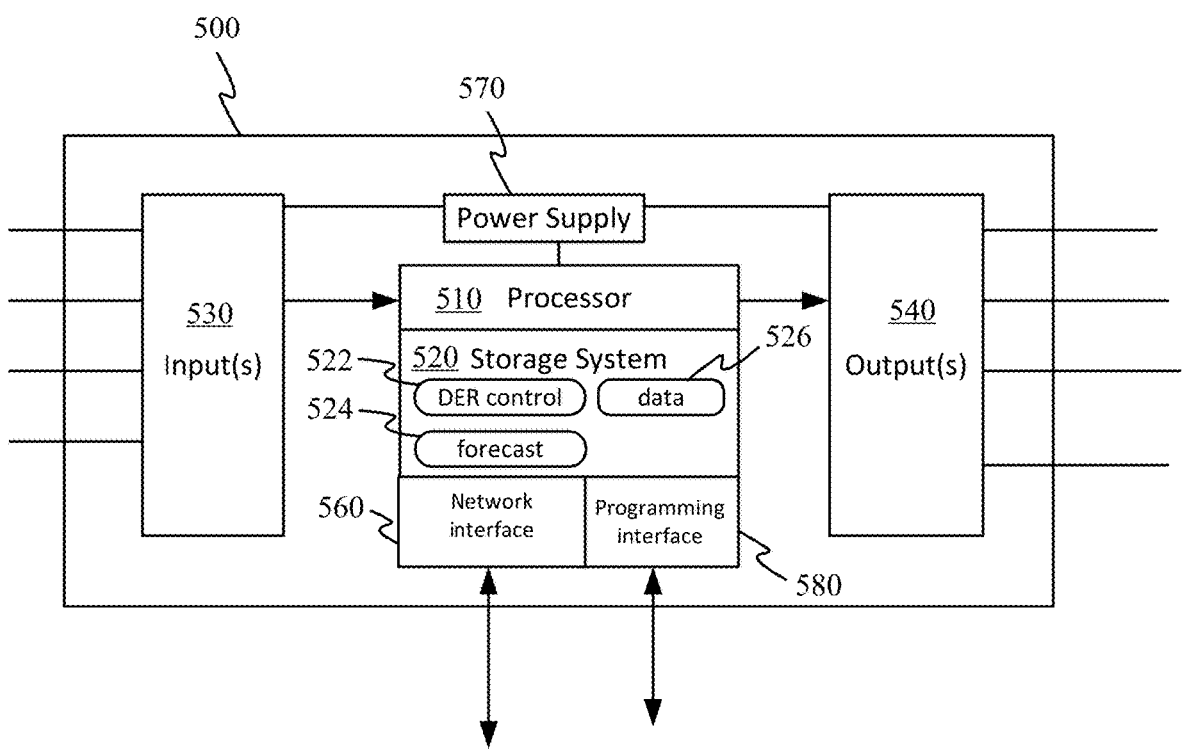
FIG. 5 illustrates a schematic representation of a site-level controller with forecasting.

Site-level controllers (e.g., site level controller(s) A 120 and site level controller B 130) can be embodied as any suitable controller. An on-site controller can include one or more processors such as, but not limited to, general purpose central processing units (CPUs), graphics processing units (GPUs), field programmable gate arrays (FPGAs), application specific processors, and logic devices, as well as any other type of processing device, combinations, or variations thereof. In some cases, operations carried out by the on-site controller are stored as instructions in a storage system, which can include physical storage devices that are removable and/or built in with the one or more processors. A storage system for an on-site controller may include dynamic, static, read/write, read-only, random-access, sequential-access, location-addressable, file-addressable, and/or content-addressable devices, such as optical memory (e.g., CD, DVD, HD-DVD, Blu-Ray Disc, etc.), semiconductor memory (e.g., RAM, SRAM, DRAM, ROM, EPROM, EEPROM, FLASH memory, etc.), and/or magnetic memory (e.g., hard-disk drive, floppy-disk drive, tape drive, MRAM, etc.). It should be understood that a storage device or a storage medium of the storage system includes one or more physical devices and excludes propagating signals per se. Aspects of the on-site controller may be integrated together into one or more hardware-logic components. Such hardware-logic components may include FPGAs, program- and application-specific integrated circuits (PASIC/ASICs), program- and application-specific standard products (PSSP/ASSPs), system-on-a-chip (SOC), and complex programmable logic devices (CPLDs), for example. In one implementation, site-level controller B 130 with forecasting module 135 is embodied by a programmable logic controller (PLC) such as illustrated in FIG. 5. Of course, in some implementations, site-level controller B 130 with forecasting module 135 may be implemented as a computing system such as illustrated in FIG. 4.

It should be understood that the operating environment shown in FIG. 1 is merely one example environment and that the described forecasting system and site-level controller with forecasting module may be implemented for control of other types of energy resources and different types of sites and locations. For example, the described systems are suitable for control of energy resources of a hybrid vehicle, a site with one or more electric vehicle charging stations, or a home that uses a variety of energy resources.

Figure 2A:
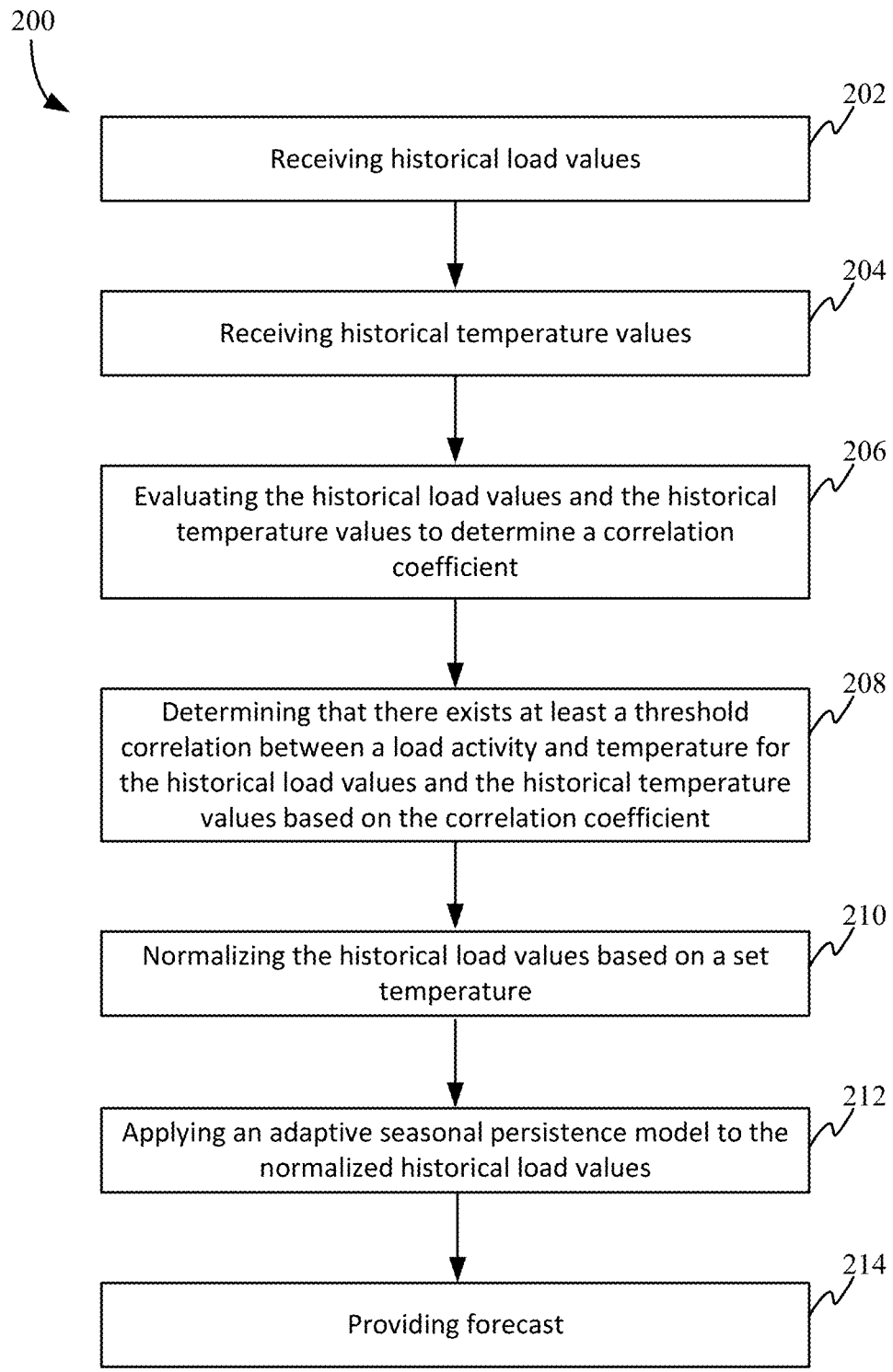
FIG. 2A shows a process of adaptive persistence forecasting for control of distributed energy resources.

FIG. 2A shows a process of adaptive persistence forecasting for control of distributed energy resources. Referring to FIG. 2A, process 200 can be carried out by a forecasting system such as described with respect to forecasting system 115 of FIG. 1 or a site-level controller with forecasting module as described with respect to site-level controller 130 of FIG. 1.

A method 200 of load control includes receiving (202) historical load values for a site with at least one component that consumes energy. Example components that consume energy include, but are not limited to, light bulbs, appliances, HVAC, industrial equipment, and electric vehicles. The historical load values can be simply a week of load values (e.g., a previous week, some week in the past, a week of the same time frame but a year before, etc.). In some cases, the historical load values cover at least a week of values and may include more than a week of values. The method further includes receiving (204) historical temperature values corresponding to dates of the historical load values. The range of dates for the historical temperature values are based on the range of dates for the historical load values. In some cases, the historical temperature values are included with the historical load values (e.g., from a same resource). In some cases, the historical temperature values are obtained from a historical temperature resource via a weather API or by some other access mechanism based on the dates (and times) of the received historical load values.

The method further evaluates (206) the historical load values and the historical temperature values to determine a correlation coefficient; and identifies if there exists at least a threshold correlation between a load activity and temperature for data of the historical load values and the historical temperature values based on the correlation coefficient. The threshold correlation may be, as a non-limiting example, 0.5.

Of course, other thresholds may be used (e.g., 0.6, 0.75, 0.9). When the method determines (208) that there exists at least the threshold correlation between the load activity and the temperature, the historical load values are normalized (210) based on a set temperature. The set temperature can be selected, for example, from temperatures between −130 degrees F. and 130 degrees F., and are most likely to be selected from temperatures in most regions between 0 and 90 degrees F. In some cases, the set temperature is selected based on the average temperature for a region. In examples provided below, a temperature of 32 degrees C. (89.6 degrees F.) and 60 degrees F. were selected as the set temperature.

An adaptive seasonal persistence model is applied (212) to the normalized historical load values to output a forecast. Details of the adaptive seasonal persistence model are provided below (and also described with respect to FIGS. 3A and 3B). When normalizing a load to a set temperature, the temperature is considered the independent variable and the load is treated as a dependent variable. A best fit line may be used to provide an estimate of the load at a given temperature, and this estimate may be used as input to the adaptive seasonal persistence model.

The forecast is then provided (214) for use in controlling in controlling energy resources at the site. For example, the forecast can be provided to a display (e.g., via a user interface which may be accessed by a site operator. As another example, the forecast can be provided to a load controller for use in suitable load control algorithms. Indeed, the forecast can be provided as input to any real time control for DERs or homes or aggregators. Before providing the forecast, the forecast can be rescaled to revert to an original scale instead of the normalized scale.

Figure 2B:
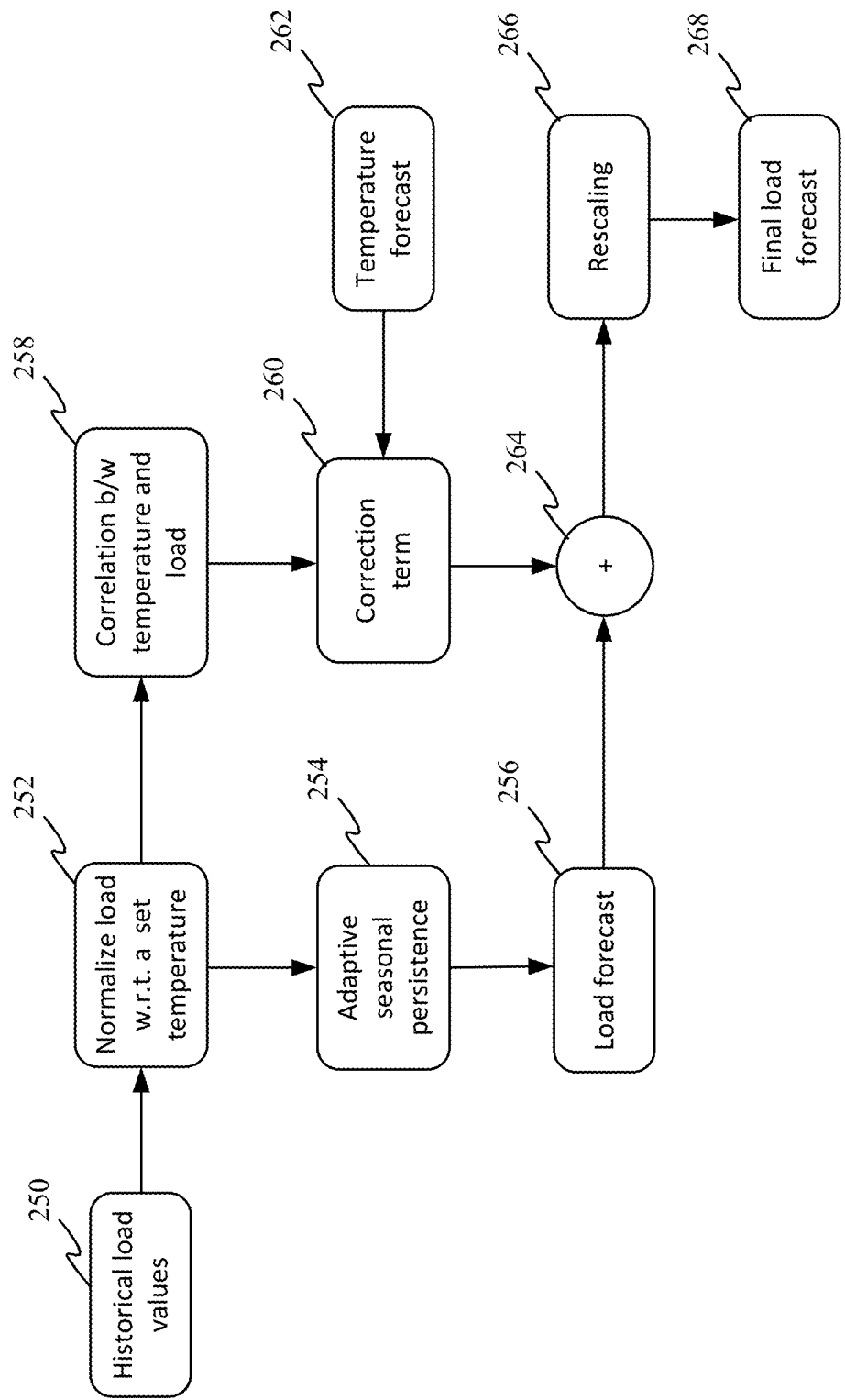
FIG. 2B illustrates example operation of a forecasting system or module.

FIG. 2B illustrates example operation of a forecasting system or module. Referring to FIG. 2B, historical load values 250 can be scaled and normalized with respect to a set temperature (252). The normalized load information is provided as input to an adaptive seasonal persistence model 254 to generate a load forecast 256. Details of the adaptive seasonal persistence model are provided below (and also described with respect to FIGS. 3A and 3B). The normalized load information is also used to determine a correlation between the temperature and the load (258). If there is a correlation of more than a particular threshold, then it is expected that there is a relationship between the load and temperature and the correlation factor can be used as a correction term 260 by taking into consideration the temperature forecast 262. The correction term 260 can then be applied (264) to the load forecast 256 and rescaled (266) to generate the final load forecast 268.

The described technique involves using the scaled historical load information with a set temperature as an input to an adaptive seasonal persistence model and then adding a correction term to the forecast, as shown in FIG. 2B. The correction term is modelled using the historical load vs temperature relationship and the forecast with the correction term is descaled to generate the final forecasts. The equation for the correction term is given as follows.

$$\text{Correction term} = \frac{f(t_{fi}) - f(t_{ref})}{f(t_{fi})}.$$

The terms $t_{ref}$ denote the reference temperature used to normalize the historical load information, $t_{fi}$ the forecasted temperature for the forecast horizon for each data point, and f( ) represents the best fitting line equation from the temperature vs load correlation.

In a persistence model, the last available values at the same time as for the prediction are chosen as the prediction. For seasonal persistence, the model further considers the last few observations at the same time as for the prediction and averages the values from the multiple observations to generate the forecast (i.e., the prediction). The seasonal persistence model can be further refined to select how many observations to average and from which dates to use (e.g., the lag values). Moreover, the averaging function can further be optimized such that mean, median, or mode are selected. This model can be referred to as an adaptive seasonal persistence model and defined as follows.

$$P(t+\Delta t|t) = f(P(t-\delta_i t))$$

Here, $P(t+\Delta t|t)$ is the forecast for a period of $\Delta t$ made at time t; f represents the function used to summarize the selected values; and $\delta_i$ are the different lag values for selecting a number of past measurements.

Figure 3A:
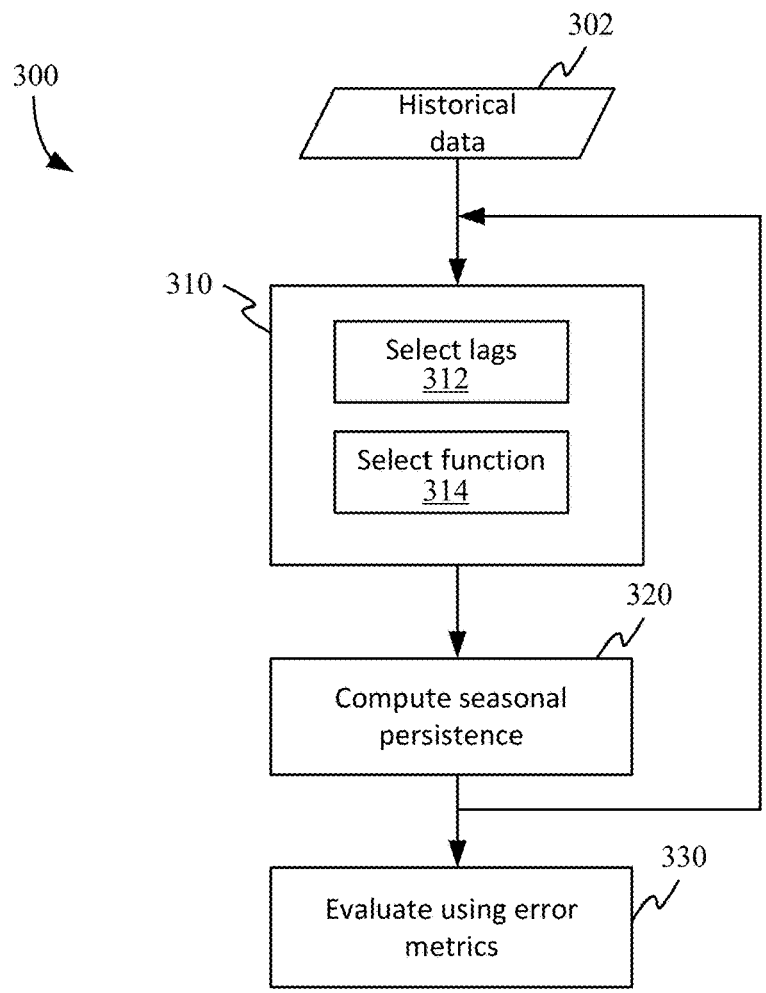
FIGS. 3A and 3B illustrate process flows for training an adaptive seasonal persistence-based forecast model using lag and function selection.
Figure 3B:
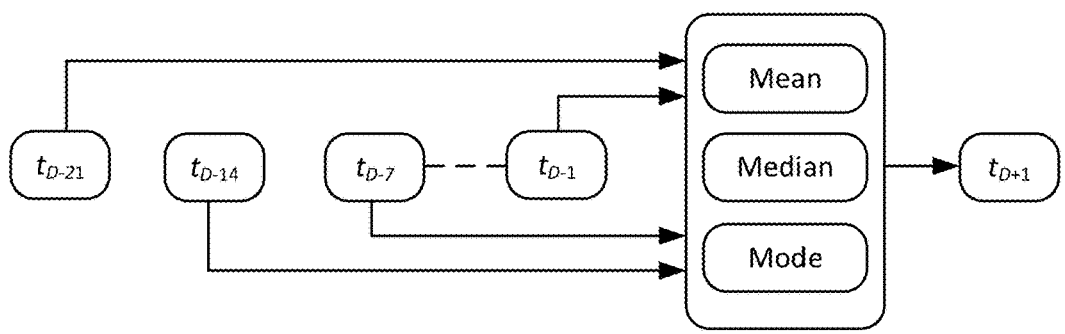

This model can make use of certain training data to select the lags and the function used to summarize/average the selected values as described with respect to FIGS. 3A and 3B.

Typically, there is no training phase for persistence based forecast models, depending on the input data set certain lags are chosen and the selected values are averaged to generate the forecasts. However, the described technique can include a training phase where, for a data set, the model can be optimized to use a particular function and particular lags.

FIGS. 3A and 3B illustrate process flows for training an adaptive seasonal persistence-based forecast model using lag and function selection.

Referring to FIG. 3A, in training process 300, the particular model used for a location/load can be trained on historical data 302 for that location/load or some other suitable location/load. The historical data 302 may be of a few days up to years before current date, and preferably at least a week of historical data. The historical data 302 is used as training data for a lag and function selection process 310 where lag values are selected (312) and the function is selected (314). An example of the lag and function selection process 310 is shown with respect to FIG. 3B. The selected lag values and function are input to the adaptive seasonal persistence model, for example, $(f(P(t-\delta_i t))$, to compute (320) the seasonal persistence. The selection process 310 and computation 320 can be iterated. The predictions for a particular date using the selected lags and functions are evaluated (330) using a set of error metrics against the historical data 302 for the particular date. The set of error metrics can include, but are not limited to, mean absolute percentage error (MAPE), root mean square percentage error (RMSPE), mean square percentage error (MSPE), average MAPE max (avg(max)), average MAPE min (avg (min)), maximum MAPE max (max(max)), and minimum MAPE min (min(min)).

The MAPE, RMSPE, and MSPE are given as follows.

$$MAPE = \frac{1}{m}\sum_{i=1}^{m}\left(\frac{1}{n}\sum_{t=1}^{n}\frac{|\hat{y}_t - y_t|}{y_t}\right)$$

$$RMSPE = \frac{1}{m}\sum_{i=1}^{m}\left(\sqrt{\frac{1}{n}\sum_{t=1}^{n}\left(\frac{\hat{y}_t - y_t}{y_t}\right)^2}\right)$$

$$MSPE = \frac{1}{m}\sum_{i=1}^{m}\left(\frac{1}{n}\sum_{t=1}^{n}\left(\frac{\hat{y}_t - y_t}{y_t}\right)^2\right)$$

where $\hat{y}_t$ are the forecasted values of particular dates from the seasonal persistence model with selected lags and functions, $y_t$ are the actual values of the particular dates, n is the number of data points in the forecast period, and m is the number of forecast iterations.

For the avg(max) and avg(min), the maximum and minimum MAPE in each forecast iteration are noted and their average value is calculated. The maximum of the maximum and the minimum of all the minimum in each forecast iterations are denoted by the max(max) and min(min). These four additional metrices can capture the variation of the model's performance in each iteration.

By evaluating (330) the results of the error metrics, the optimal seasonal persistence-based model can be identified for the location. For certain implementations, the training process can be carried out on-site at a forecasting system such as forecasting system 115 of FIG. 1 or at a site-level controller such as site-level controller B 130 with forecasting module 135 of FIG. 1. In some of such implementations, the model may be updated over time (e.g., by periodic execution of the training process, in response to certain triggers, by continuous execution of the training process, or by some other suitable approach). Indeed, the model used during normal operation can be trained and updated over time to find the best lags and function for the predictions for a particular type of load.

Referring to FIG. 3B, during the lag and function selection process 310 of the training process 300, a series of lag options and a set of functions can be provided for selection and used to compute seasonal persistence to output a prediction. FIG. 3B represents the proposed lag and function selection process. A set of predictions for a particular date ($t_{D+1}$) can be generated for each available lag selection/combination and function. Here, lags of $t_{D-1}$, $t_{D-2}$, $t_{D-3}$, $t_{D-4}$, $t_{D-5}$, $t_{D-6}$, $t_{D-7}$, $t_{D-14}$, $t_{D-21}$, where D represents the current date, are shown as available for selection and the mean, median, and mode functions may be used. Of course, these example lags should not be construed as limiting.

As can be seen with respect to FIGS. 2B and 3A, adaptive persistence forecasting involves an adaptive seasonal persistence with the added ability to incorporate other features of the predictor variable. The additional features are able to be incorporated with the historical load data to generate forecasts.

FIG. 4 illustrates a representation of a forecasting system. Referring to FIG. 4, a forecasting system 400 can include one or more processors 410, memory storage 420, and a network interface 440. Instructions for performing adaptive persistence forecasting 430 can be stored in memory storage 420 that when executed by the one or more processors 410 direct the forecasting system 400 to perform operations as described herein for performing adaptive persistence forecasting, for example, including performing training process 300 as described with respect to FIG. 3A, performing operations such as described with respect to FIGS. 2A and 2B, communicating with a weather/temperature service to obtain weather/temperature information via the network interface 440, and communicating with a site-level controller or other system that communicates with a site-level controller to provide the forecasted information.

System 400 may be implemented within a single computing device or distributed across multiple computing devices or sub-systems that cooperate in executing program instructions. In some cases, the system 400 includes one or more blade server devices, standalone server devices, personal computers, routers, hubs, switches, bridges, firewall devices, intrusion detection devices, mainframe computers, network-attached storage devices, and other types of computing devices. In some cases, system 400 is fully implemented within a single board computer.

Memory storage 420 can include any computer readable storage media readable by processor(s) 410 and capable of storing instructions for adaptive persistence forecasting 430 and data. Memory storage 420 may be implemented as a single storage device but may also be implemented across multiple storage devices or sub-systems co-located or distributed relative to each other. Memory storage 420 may include additional elements, such as a controller, capable of communicating with processor(s) 410.

Network interface 440 may provide communication connections and devices that allow for communication between system 400 and other computing systems over a communication network or collection of networks or the air.

FIG. 5 illustrates a schematic representation of a site-level controller with forecasting. Referring to FIG. 5, a site-level controller 500 can include a processor 510; a storage system 520 storing instructions 522 for DER control, instructions for performing adaptive persistence forecasting 524, and data 526; a field input interface 530; a field output interface 540; and a network interface 560. The site-level controller 500 can also include a power supply 570 (e.g., a battery and/or AC to DC converter) and a programming interface 580 (through which instructions can be loaded onto the storage system. As illustrated, the site-level controller 500 can be embodied as a programmable logic controller (PLC).

The field input interface 530 can receive signals from connected devices at a microgrid, including but not limited to buttons, switches (e.g., proximity switches or photoelectric switches that can sense presence of object, limit switches, condition switches to indicate detection of pressure, temperature, etc.), and sensors (e.g., simple sensors such as temperature sensor or pressure sensor, complex sensors such as positioning systems or machine vision systems). Other inputs can be received via the field input interface 530 directly or via the network interface 560, including information from other PLCs or controllers.

The processor 510 processes the received signals according to the instructions for DER control 522 stored at the storage system 520 and outputs control signals via the field output interface 540. The processor 510 can also perform adaptive persistence forecasting 524, including operations such as described with respect to FIGS. 2A and 2B, the result of which may be used during performing the instructions for DER control 522.

The field output interface 540 may be coupled to elements such as, but not limited to, as indicators (e.g., lamps), sirens, electric motors, pneumatic or hydraulic pumps, and magnetic relays.

The storage system 520 can be one or more of any suitable storage medium including volatile (e.g., random access memory such as DRAM and SRAM) and non-volatile memory (e.g., flash memory, ferroelectric or magnetic random-access memory). As mentioned above, the storage system 520 can include the instructions 522, 524, and data 526, including any data received by an input to the controller that is used by the controller 500. In some cases, an operating system can be included as executable instructions stored on the storage system 520.

The programming interface 580 can include a serial port or other interface that can couple to a programming device for loading program instructions, such as instructions 522, (and optional data) into the storage system. The controller 500 can be ruggedized, providing tolerance of environmental conditions such as dust, moisture, heat, cold, and radiation.

Simulations

The adaptive seasonal persistence technique was tested on different types of load data and compared to traditional methods such as Random Forest (RF), Support Vector Machines (SVM), K Nearest Neighbors (KNN), Gradient Boosting (GB), Bayesian Ridge (BR), and Multilayer perceptron (MLP).

Figure 6A:
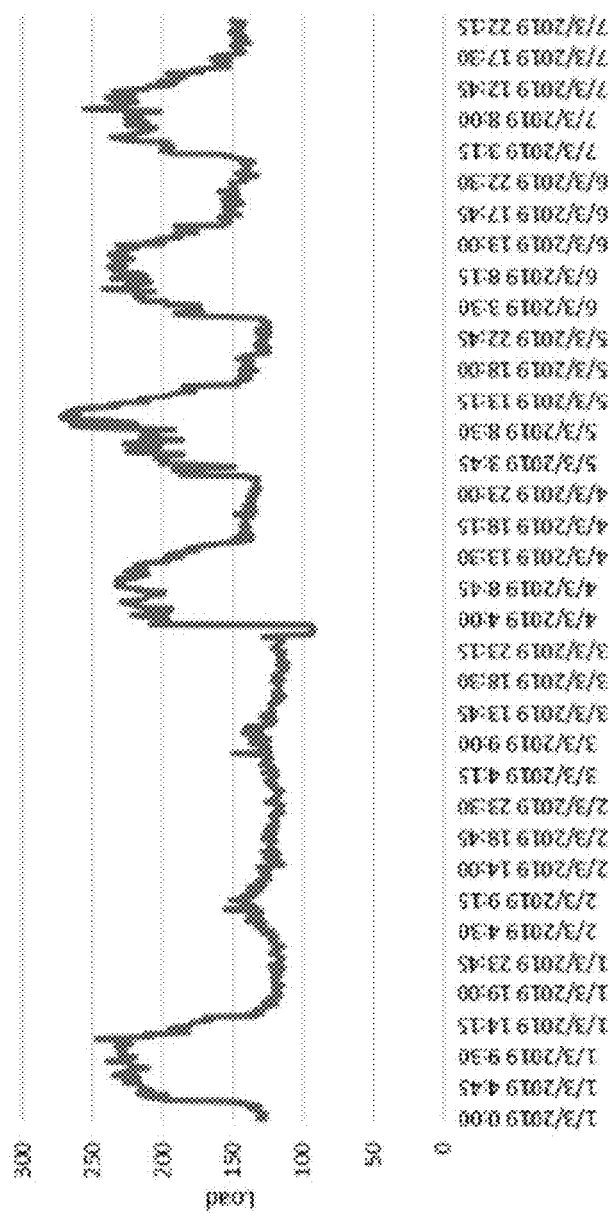
FIGS. 6A and 6B show plots of load data used in tests of the adaptive seasonal persistence technique described herein.
Figure 6B:
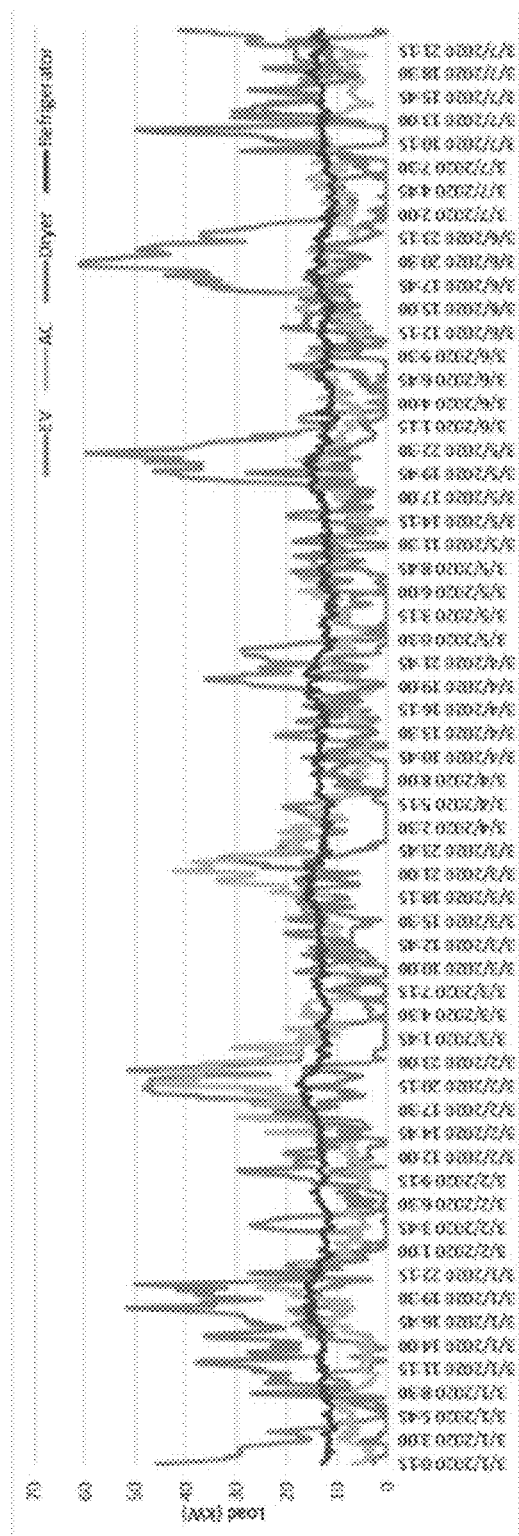

FIGS. 6A and 6B show plots of load data used in tests of the adaptive seasonal persistence technique described herein.

Test 1: The initial test of the method was conducted on an office building data from Pune, India. The historical load and weather values for a whole year in 2019 with a 15-minute resolution is used for the model development. FIG. 6A shows the load profile for a week from Mar. 1-7, 2019. The significant reduction in the power usage on the weekend (March 2-3) can be seen from the figure. The power again follows a usage pattern starting from beginning of the weekday (March $4^{th}$).

The performance of the different versions of the proposed modified seasonal persistence over the traditional methods are shown in Table 1. The table lists the forecast error in multiple metrices to get a detailed performance evaluation. The predictions were performed for a forecast horizon of 24 hours with 15-minute data resolution. The whole year of available data was used for the analysis with 80% of the data for training and 20% of the data for testing. The methods are compared against RF, SVM, KNN and classical persistence (D-1). The superiority of the proposed method is evident from the results. Among the different versions of the modified persistence explored, the method 'D-1,7,14,21,28' had the best performance.

TABLE 1

| Methods | MAPE (avg) | Avg (max) | Avg (min) | Max (max) | Min (min) | RMSPE | MSPE |
|---|---|---|---|---|---|---|---|
| RF | 12.6 | 41.3 | 1.3 | 198.9 | 0.0 | 15.6 | 3.6 |
| SVM | 12.1 | 39.8 | 1.1 | 172.1 | 0.0 | 15.2 | 3.4 |
| KNN | 13.8 | 47.2 | 0.8 | 192.7 | 0.0 | 17.5 | 4.4 |
| D-1 | 17.3 | 56.6 | 0.6 | 160.6 | 0.0 | 22.5 | 7.3 |
| D-1, 2, 3 | 21.9 | 58.0 | 1.9 | 158.3 | 0.0 | 26.6 | 9.8 |
| D-1 . . . 7 | 19.2 | 51.5 | 1.7 | 167.3 | 0.0 | 23.3 | 7.9 |
| D-1, 7, 14, 21, 28 | 10.9 | 38.0 | 0.9 | 156.2 | 0.0 | 13.8 | 2.9 |
| D-7, 14, 21, 28 | 11.2 | 38.6 | 1.1 | 178.5 | 0.0 | 14.2 | 3.3 |

As can be seen from Table 1, the method 'D-1,7,14,21, 28' had a 10% improvement in MAPE over SVM, 13% over RF, 21% over KNN and 37% over classical persistence. There is a significant reduction in computational time while using the modified persistence because of its lack of a trained model. Advantageously, once the lags, and function are determined, the forecast can be generated in a matter of microseconds.

Test 2: The proposed method was also utilized to predict the day-ahead values of aggregated appliance level data. The appliance level data from multiple residential households ("Pecan St") was used for this analysis. The residential data level raw data is sent through a pre-processing module to handle the data quality issues and then aggregated at an appliance level. FIG. 6B shows the aggregated appliance level load profiles from Mar. 1-7, 2020. Table 2 shows how each method performed on aggregated residential appliance level data.

TABLE 2

| Appliance | RF | SVM | KNN | GB | BR | MLP | D-1 | D-1, 2, 3 | D-1 . . . 7 | D-1, 7, 14, 21 | D-7, 14, 21 |
|---|---|---|---|---|---|---|---|---|---|---|---|
| AC power | 21.4 | 21.7 | 23.9 | 21.2 | 21.3 | 28.7 | 17.2 | 15.2 | 19.2 | 19.5 | 23.0 |
| Bedroom | 8.7 | 14.3 | 11.8 | 11.7 | 9.0 | 10.0 | 10.5 | 8.4 | 7.7 | 7.8 | 8.0 |
| Furnace | 13.0 | 19.9 | 15.6 | 13.1 | 13.1 | 20.2 | 11.5 | 10.0 | 12.0 | 12.1 | 14.4 |
| Kitchen | 11.9 | 26.2 | 12.7 | 12.0 | 12.3 | 14.8 | 15.1 | 12.7 | 11.8 | 11.8 | 12.2 |
| Pool | 33.4 | 63.7 | 33.4 | 33.3 | 35.4 | 34.4 | 33.1 | 32.0 | 32.4 | 31.0 | 33.6 |
| Refrigerator | 4.3 | 8.8 | 5.4 | 4.2 | 4.1 | 4.6 | 5.3 | 4.3 | 4.1 | 4.4 | 4.7 |
| Others | 40.2 | 86.5 | 45.2 | 40.7 | 45.3 | 48.3 | 25.4 | 21.3 | 19.7 | 19.2 | 19.4 |
| Aggregate | 14.5 | 14.7 | 17.5 | 14.5 | 14.7 | 25.7 | 12.4 | 10.8 | 13.5 | 13.6 | 16.0 |

Table 3 shows a detailed evaluation based on different error metrics for aggregated air-conditioning load.

TABLE 3

| Methods | MAPE (avg) | Avg (max) | Avg (min) | Max (max) | Min (min) | RMSPE | MSPE |
|---|---|---|---|---|---|---|---|
| RF | 21.4 | 65.9 | 1.5 | 298.0 | 0.0 | 26.4 | 10.0 |
| SVM | 21.7 | 70.1 | 1.2 | 237.7 | 0.0 | 27.0 | 9.7 |
| KNN | 23.9 | 69.6 | 1.4 | 197.3 | 0.0 | 29.2 | 11.0 |
| GB | 21.2 | 68.2 | 1.1 | 217.2 | 0.0 | 26.4 | 9.1 |
| BR | 21.3 | 63.7 | 1.1 | 235.1 | 0.0 | 25.9 | 9.1 |
| D-1 | 17.2 | 51.3 | 0.8 | 181.5 | 0.0 | 20.6 | 8.2 |
| D-1, 2, 3 | 15.2 | 45.2 | 0.8 | 144.1 | 0.0 | 18.6 | 5.6 |
| D-1 . . . 7 | 19.2 | 50.3 | 2.1 | 185.9 | 0.0 | 22.8 | 7.8 |
| D-1, 7, 14, 21 | 19.5 | 53.7 | 1.6 | 196.2 | 0.0 | 23.4 | 9.7 |
| D-7, 14, 21 | 23.0 | 59.8 | 2.4 | 207.6 | 0.0 | 27.2 | 11.9 |

Table 4 shows a detailed evaluation based on different error metrics for aggregated bedroom load.

TABLE 4

| Methods | MAPE (avg) | Avg (max) | Avg (min) | Max (max) | Min (min) | RMSPE | MSPE |
|---|---|---|---|---|---|---|---|
| RF | 8.7 | 30.0 | 0.1 | 46.8 | 0.0 | 10.9 | 1.3 |
| SVM | 14.3 | 35.9 | 0.3 | 51.0 | 0.0 | 17.6 | 3.2 |
| KNN | 11.8 | 39.3 | 0.2 | 96.3 | 0.0 | 14.8 | 2.4 |
| GB | 11.7 | 36.6 | 0.2 | 79.2 | 0.0 | 14.5 | 2.3 |
| BR | 9.0 | 26.5 | 0.2 | 46.6 | 0.0 | 11.1 | 1.3 |
| D-1 | 10.5 | 47.3 | 0.1 | 66.1 | 0.0 | 14.6 | 2.2 |
| D-1, 2, 3 | 8.4 | 31.9 | 0.1 | 42.9 | 0.0 | 10.9 | 1.2 |
| D-1 . . . 7 | 7.7 | 28.1 | 0.1 | 38.4 | 0.0 | 9.9 | 1.0 |
| D-1, 7, 14, 21 | 7.8 | 32.3 | 0.1 | 51.2 | 0.0 | 10.3 | 1.1 |
| D-7, 14, 21 | 8.0 | 32.7 | 0.1 | 59.3 | 0.0 | 10.5 | 1.2 |

Table 5 shows a detailed evaluation based on different error metrics for aggregated furnace load.

TABLE 5

| Methods | MAPE (avg) | Avg (max) | Avg (min) | Max (max) | Min (min) | RMSPE | MSPE |
|---|---|---|---|---|---|---|---|
| RF | 13.0 | 38.3 | 0.6 | 96.1 | 0.0 | 15.7 | 3.1 |
| SVM | 19.9 | 66.1 | 0.4 | 157.4 | 0.0 | 24.7 | 6.8 |
| KNN | 15.6 | 44.7 | 0.6 | 108.8 | 0.0 | 18.9 | 4.3 |
| GB | 13.1 | 40.4 | 0.5 | 99.3 | 0.0 | 16.0 | 3.1 |
| BR | 13.1 | 38.2 | 0.6 | 100.0 | 0.0 | 15.8 | 3.0 |
| D-1 | 11.5 | 35.7 | 0.4 | 92.3 | 0.0 | 13.9 | 2.8 |
| D-1, 2, 3 | 10.0 | 30.9 | 0.4 | 77.5 | 0.0 | 12.2 | 2.0 |
| D-1 . . . 7 | 12.0 | 32.5 | 1.0 | 84.1 | 0.0 | 14.2 | 2.7 |
| D-1, 7, 14, 21 | 12.1 | 35.3 | 0.4 | 111.2 | 0.0 | 14.6 | 3.2 |
| D-7, 14, 21 | 14.4 | 39.3 | 0.7 | 117.5 | 0.0 | 17.0 | 4.0 |

Table 6 shows a detailed evaluation based on different error metrics for aggregated Kitchen load.

TABLE 6

| Methods | MAPE (avg) | Avg (max) | Avg (min) | Max (max) | Min (min) | RMSPE | MSPE |
|---|---|---|---|---|---|---|---|
| RF | 11.9 | 45.4 | 0.2 | 79.6 | 0.0 | 15.1 | 2.3 |
| SVM | 26.2 | 98.6 | 0.3 | 127.5 | 0.0 | 36.2 | 13.3 |
| KNN | 12.7 | 49.8 | 0.2 | 106.2 | 0.0 | 16.3 | 2.7 |
| GB | 12.0 | 45.6 | 0.2 | 81.5 | 0.0 | 15.3 | 2.4 |
| BR | 12.3 | 46.1 | 0.2 | 83.2 | 0.0 | 15.6 | 2.5 |
| D-1 | 15.1 | 62.4 | 0.3 | 105.4 | 0.0 | 19.3 | 3.8 |
| D-1, 2, 3 | 12.7 | 48.7 | 0.2 | 82.0 | 0.0 | 16.1 | 2.6 |
| D-1 . . . 7 | 11.8 | 44.4 | 0.2 | 77.0 | 0.0 | 14.9 | 2.3 |
| D-1, 7, 14, 21 | 11.8 | 45.9 | 0.2 | 94.9 | 0.0 | 15.1 | 2.3 |
| D-7, 14, 21 | 12.2 | 47.0 | 0.2 | 93.4 | 0.0 | 15.6 | 2.5 |

Table 7 shows a detailed evaluation based on different error metrics for aggregated pool load.

TABLE 7

| Methods | MAPE (avg) | Avg (max) | Avg (min) | Max (max) | Min (min) | RMSPE | MSPE |
|---|---|---|---|---|---|---|---|
| RF | 33.4 | 286.8 | 0.4 | 925.1 | 0.0 | 57.4 | 42.1 |
| SVM | 63.7 | 582.6 | 0.9 | 1877.1 | 0.0 | 114.9 | 172.1 |
| KNN | 33.4 | 277.2 | 0.4 | 1238.2 | 0.0 | 56.6 | 41.7 |
| GB | 33.3 | 292.9 | 0.4 | 811.1 | 0.0 | 57.4 | 41.5 |
| BR | 35.4 | 298.2 | 0.3 | 886.4 | 0.0 | 61.4 | 46.8 |
| D-1 | 33.1 | 308.2 | 0.2 | 2063.0 | 0.0 | 57.9 | 53.5 |
| D-1, 2, 3 | 32.0 | 292.3 | 0.3 | 1951.9 | 0.0 | 54.8 | 49.6 |
| D-1 . . . 7 | 32.4 | 275.6 | 0.4 | 1775.2 | 0.0 | 55.0 | 45.5 |
| D-1, 7, 14, 21 | 31.0 | 242.1 | 0.4 | 814.5 | 0.0 | 51.5 | 32.4 |
| D-7, 14, 21 | 33.6 | 251.8 | 0.4 | 560.3 | 0.0 | 54.9 | 35.6 |

Table 8 shows a detailed evaluation based on different error metrics for aggregated refrigerator load.

TABLE 8

| Methods | MAPE (avg) | Avg (max) | Avg (min) | Max (max) | Min (min) | RMSPE | MSPE |
|---|---|---|---|---|---|---|---|
| RF | 4.3 | 15.1 | 0.1 | 22.3 | 0.0 | 5.4 | 0.3 |
| SVM | 8.8 | 32.3 | 0.1 | 41.1 | 0.0 | 11.8 | 1.4 |
| KNN | 5.4 | 17.5 | 0.1 | 28.1 | 0.0 | 6.7 | 0.5 |
| GB | 4.2 | 15.0 | 0.1 | 21.9 | 0.0 | 5.3 | 0.3 |
| BR | 4.1 | 14.8 | 0.1 | 22.3 | 0.0 | 5.2 | 0.3 |
| D-1 | 5.3 | 18.9 | 0.1 | 25.2 | 0.0 | 6.7 | 0.5 |
| D-1, 2, 3 | 4.3 | 15.7 | 0.1 | 21.4 | 0.0 | 5.6 | 0.3 |
| D-1 . . . 7 | 4.1 | 15.0 | 0.1 | 21.0 | 0.0 | 5.2 | 0.3 |
| D-1, 7, 14, 21 | 4.4 | 15.3 | 0.1 | 21.1 | 0.0 | 5.5 | 0.3 |
| D-7, 14, 21 | 4.7 | 16.2 | 0.1 | 24.7 | 0.0 | 5.9 | 0.4 |

As can be seen from the tables, different methods were explored to develop day-ahead forecasts for aggregated appliance level values. The proposed modified seasonal persistence outperformed all the explored traditional methods of RF, SVM, KNN, GB, and MLP. The values highlighted in bold represents the best method based on the lowest MAPE value for each of the residential appliances. In all the 7 different appliances and the aggregate load, the modified persistence is having the best MAPE value. In the case of air conditioner load, the method 'D-1,2,3' is having 28.3% improvement in MAPE over the conventional methods. Similarly, the application of modified persistence yielded an improvement of 11.4% for bedroom load, 23% for furnace, 0.8% for Kitchen, 6.9% pool load, 4.6% for refrigerator, and 25.5% for the aggregate load.

Figure 7:
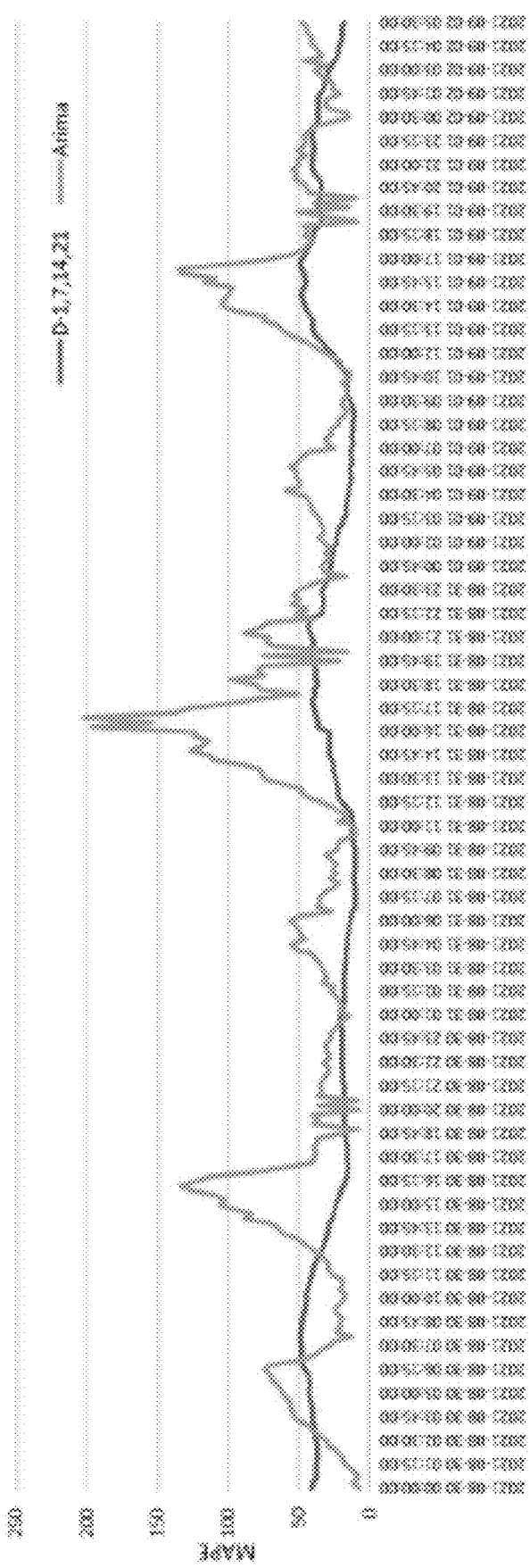
FIG. 7 shows the mean absolute percentage error (MAPE) from each iteration of 6 hour ahead forecast using Auto Regressive Integrated Moving Average (ARIMA) and a selected modified persistence model.

Test 3: The testing of the proposed model was also performed on the load data for an industrial complex. Auto Regressive Integrated Moving Average (ARIMA) was used to do a 6-hour ahead forecast using the historical load values. The forecasts using ARIMA have a MAPE of 46.9, while the application of the D-1,7,14,21 method yielded a MAPE of 28.1, a 40% improvement in accuracy. In addition to generating improved accuracy the forecasts were consistent when compared to ARIMA as shown in FIG. 7. FIG. 7 shows the MAPE from each iteration of 6 hour ahead forecast using ARIMA and a selected modified persistence model. Table 9 shows a detailed evaluation based on different error metrics.

TABLE 9

| Methods | MAPE (avg) | Avg (max) | Avg (min) | Max (max) | Min (min) | RMSPE | MSPE |
|---|---|---|---|---|---|---|---|
| RF | 32.5 | 104.3 | 3.1 | 572.4 | 0.0 | 41.2 | 23.0 |
| SVM | 38.8 | 120.1 | 5.2 | 514.9 | 0.0 | 48.0 | 29.2 |
| KNN | 37.5 | 136.7 | 2.7 | 646.9 | 0.0 | 50.2 | 31.7 |
| GB | 33.2 | 106.6 | 5.2 | 592.6 | 0.0 | 41.4 | 23.4 |
| BR | 38.8 | 110.9 | 7.0 | 526.2 | 0.0 | 46.5 | 28.5 |
| D-1 | 32.2 | 78.5 | 7.6 | 247.4 | 0.0 | 37.8 | 18.7 |
| D-1, 2, 3 | 28.3 | 60.1 | 8.3 | 163.9 | 0.1 | 31.9 | 12.2 |
| D-1 . . . 7 | 21.1 | 56.1 | 5.0 | 215.3 | 0.3 | 24.7 | 7.1 |
| D-1, 7, 14, 21 | 28.1 | 72.8 | 4.8 | 238.5 | 0.1 | 33.3 | 13.2 |
| D-7, 14, 21 | 28.9 | 78.6 | 4.3 | 235.3 | 0.0 | 34.8 | 15.7 |

Test 4: Yukon HVAC data. The method was also tested on HVAC data for a day-ahead forecast with hourly resolution. The results are shown in Table 10.

TABLE 10

| Methods | MAPE (avg) | Avg (max) | Avg (min) | Max (max) | Min (min) | RMSPE | MSPE |
|---|---|---|---|---|---|---|---|
| D-1 | 19.0 | 43.9 | 2.7 | 109.3 | 0.0 | 22.4 | 6.9 |
| D-1, 2, 3 | 22.8 | 49.5 | 4.3 | 160.5 | 0.0 | 26.5 | 9.7 |
| D-1 . . . 7 | 25.1 | 54.4 | 5.0 | 137.2 | 0.0 | 29.2 | 11.7 |
| D-1, 7, 14, 21 | 29.4 | 61.3 | 7.2 | 171.6 | 0.1 | 33.6 | 17.5 |
| D-7, 14, 21 | 37.0 | 73.2 | 11.6 | 207.4 | 0.1 | 41.5 | 26.1 |

The adaptive seasonal persistence technique with correction term was tested on different types of load data.

Figure 8A:
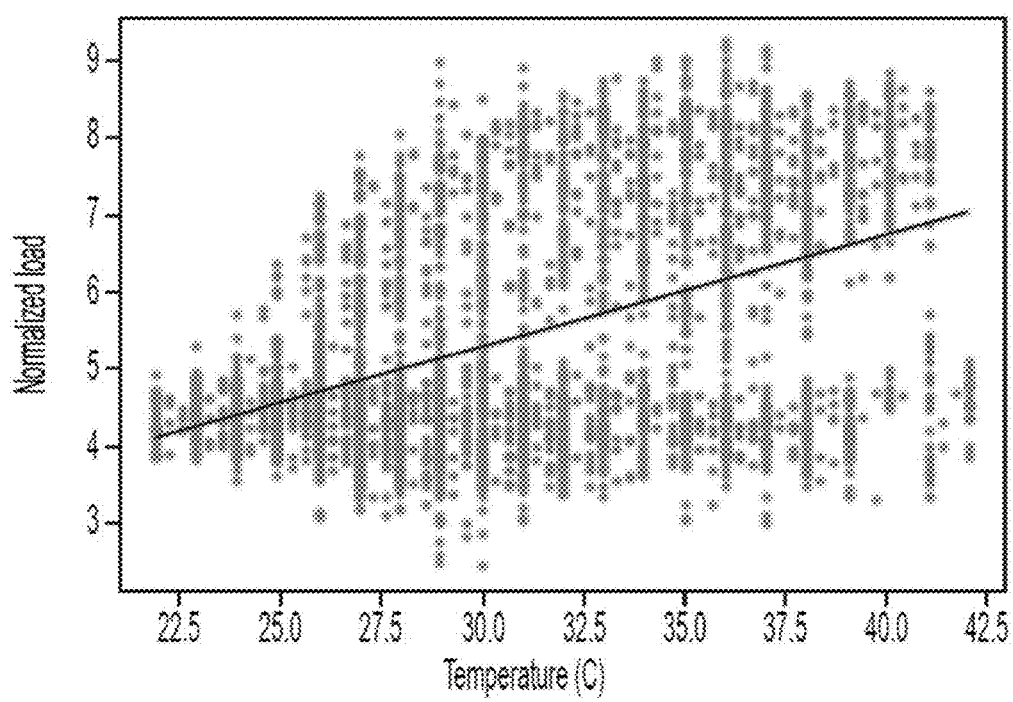
FIG. 8A shows a plot of temperature vs normalized Pune load.

The application of the proposed method on the Pune load data as provided in Test 1 is given in Table 11. Here, the data was normalized with a set temperature of 32 degree Celsius. FIG. 8A shows a plot of temperature vs normalized Pune load.

TABLE 11

|  | D-1 | D-1, 2, 3 | D-1 ... 7 | D-1, 7, 14, 21 | D-7, 14, 21 | MIN |
|---|---|---|---|---|---|---|
| Pune load | 15.83 | 21.55 | 18.05 | 10.85 | 11.50 | 10.85 |

As can be seen from Table 11 in comparison with the MAPE value in Table 1, the proposed method had a 0.5% improvement in performance over the same method without temperature correction.

The method was also tested on the aggregated residential level data from Pecan St as provided in Test 2, with a reference temperature of 60-degree Fahrenheit. The results are shown in Table 12, with most appliances showing similar or improved over their counterpart method without temperature correction.

TABLE 12

|  | D-1 | D-1, 2, 3 | D-1 ... 7 | D-1, 7, 14, 21 | D-7, 14, 21 | MIN |
|---|---|---|---|---|---|---|
| AC power | 17.30 | 15.14 | 19.05 | 19.49 | 23.06 | 15.14 |
| Bedroom | 10.51 | 8.38 | 7.71 | 7.83 | 8.00 | 7.71 |
| Furnace | 11.50 | 9.97 | 11.85 | 12.10 | 14.40 | 9.97 |
| Kitchen | 15.12 | 12.76 | 11.83 | 11.83 | 12.21 | 11.83 |
| Pool | 33.50 | 32.34 | 32.69 | 31.38 | 33.97 | 31.38 |
| Refrigerator | 5.33 | 4.36 | 4.11 | 4.44 | 4.74 | 4.11 |
| Others | 25.65 | 21.50 | 19.91 | 19.46 | 19.65 | 19.46 |
| Aggregate | 12.43 | 10.75 | 13.37 | 13.50 | 15.96 | 10.75 |

Figure 8B:
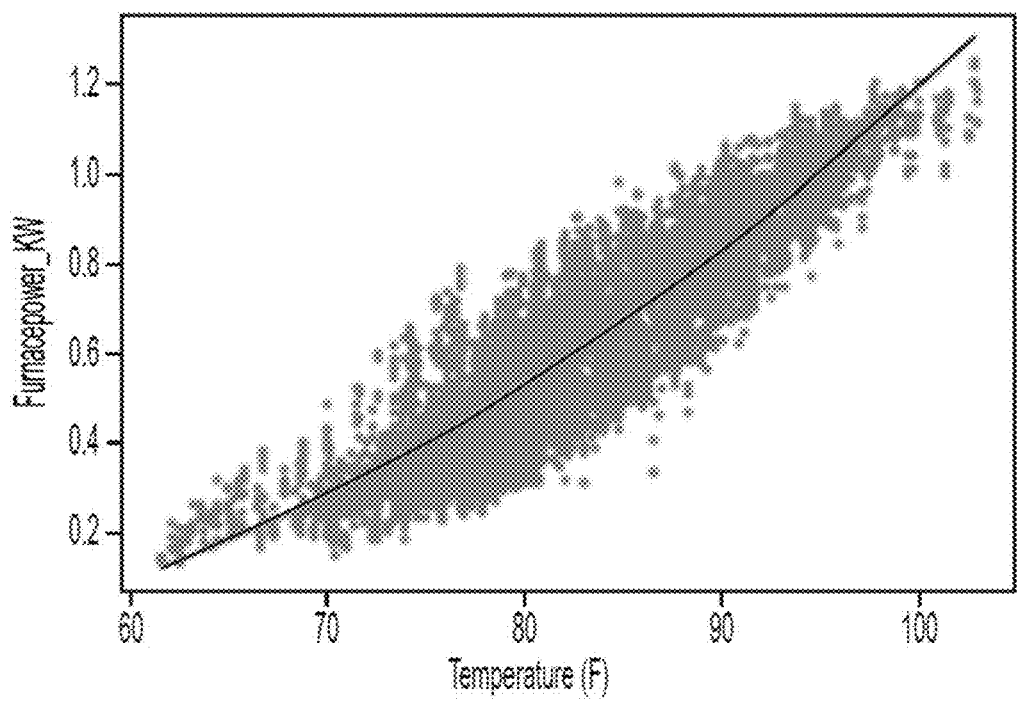
FIG. 8B shows a plot of temperature vs normalized Pecan St load (Furnace).
Figure 8C:
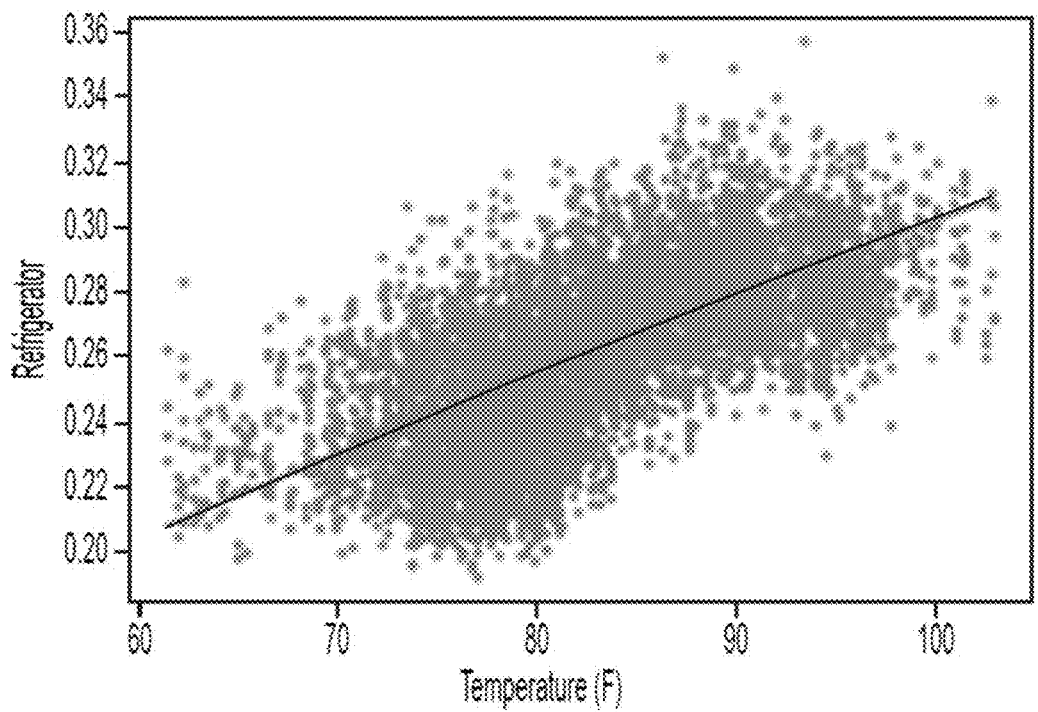
FIG. 8C shows a plot of temperature vs normalized Pecan St load (Refrigerator).

FIG. 8B shows a plot of temperature vs normalized Pecan St load (Furnace) and FIG. 8C shows a plot of temperature vs normalized Pecan St load (Refrigerator). The best fitting line is shown in the figures. A clear correlation can be seen in the case of furnace, which is also reflected in the 0.5% improvement in performance as shown in Table 12 compared with Table 2 (or Table 5).

Figure 8D:
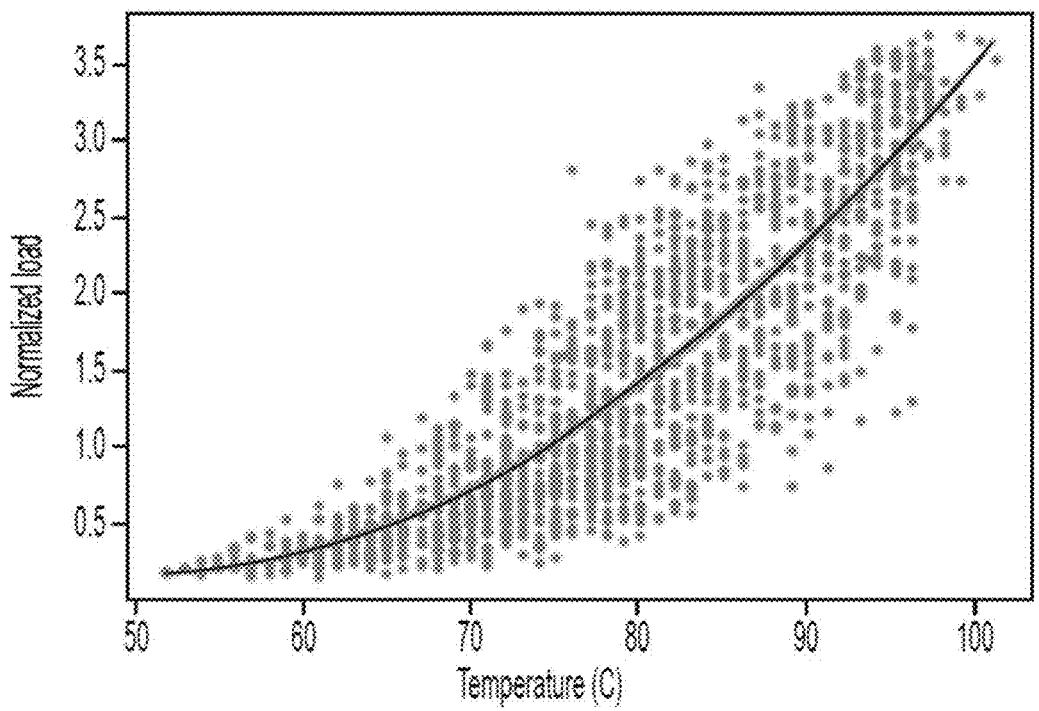
FIG. 8D shows a plot of temperature vs normalized Yukon HVAC load.

The Yukon HVAC load data such as provided in Test 4 was also tested. FIG. 8D shows a plot of temperature vs normalized Yukon HVAC load.

The proposed method can be useful in forecasting values with a high correlation with a predictor variable.

As can be seen, the described techniques outperformed conventional methods of RF, SVM, KNN, GB, and MLP.

A large dataset of historical data is not needed as only a small amount of data can be used to select the parameters for the model.

The technique has low computational requirements and can be implemented in IoT devices with low computational capabilities (e.g., a single board computer such as Beagle-Bone circuit board, which was used in the test scenarios, or Raspberry Pi).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of adaptive persistence forecasting for load control comprising:
   receiving historical load values for a site comprising at least one component that consumes energy;
   receiving historical temperature values corresponding to dates of the historical load values;
   evaluating the historical load values and the historical temperature values to determine a correlation coefficient;
   determining that there exists at least a threshold correlation between a load activity and temperature for the historical load values and the historical temperature values based on the correlation coefficient;
   in response to determining that there exists at least the threshold correlation, normalizing the historical load values based on a set temperature;
   applying an adaptive seasonal persistence model to the normalized historical load values to output a forecast;
   receiving a temperature prediction;
   generating a correction term using the temperature prediction and a correlation relationship between the historical load values and the historical temperature values identified when evaluating the historical load values and the historical temperature values;
   applying the correction term to the forecast;
   rescaling the forecast; and
   controlling energy resources at the site using the rescaled forecast.

2. The method of claim 1, wherein the correction term is given as:

$$\text{correction term} = \frac{f(t_{fi}) - f(t_{ref})}{f(t_{fi})}$$

where $t_{ref}$ is the set temperature, $t_{fi}$ is the temperature prediction and $f(\ )$ represents a best fitting line equation from the correlation relationship between the historical load values and the historical temperature values identified when evaluating the historical load values and the historical temperature values.

3. The method of claim 1, wherein the adaptive seasonal persistence model is given as:

$$P(t+\Delta t|t) = f(P(t-\delta_i t),$$

where $P(t+\Delta t|t)$ is the forecast for a time period $\Delta t$ made at time t, f represents a function used to summarize selected values from the historical load values, and $\delta_i$ are lag values for selecting a number of past measurements from the historical load values.

4. The method of claim 3, further comprising training the adaptive seasonal persistence model on the received historical load values.

5. The method of claim 4, wherein the adaptive seasonal persistence model is updated over time.

6. The method of claim 4, wherein training the adaptive seasonal persistence model on the received historical load values comprises:
   selecting a set of lag values;
   selecting a function from a set of functions comprising mean, median, and mode;
   generating a prediction for a particular date using the adaptive seasonal persistence model with selected set of lag values and selected function;
   iterating the selecting of the set of lag values, selecting of the function, and generating the prediction for the particular date to generate a set of models; and
   evaluating each model of the set of models using at least one error metric to identify an optimal seasonal persistence model, wherein the optimal seasonal persistence model is used as the adaptive seasonal persistence model when applying the adaptive seasonal persistence model to the normalized historical load values to output the forecast.

7. The method of claim 6, wherein the at least one error metric is selected from the group consisting of:
mean absolute percentage error (MAPE),
root mean square percentage error (RMSPE), and
mean square percentage error (MSPE), where $$MAPE = \frac{1}{m}\sum_{i=1}^{m}\left(\frac{1}{n}\sum_{t=1}^{n}\frac{|\hat{y}_t - y_t|}{y_t}\right)$$

$$RMSPE = \frac{1}{m}\sum_{i=1}^{m}\left(\sqrt{\frac{1}{n}\sum_{t=1}^{n}\left(\frac{\hat{y}_t - y_t}{y_t}\right)^2}\right)$$

$$MSPE = \frac{1}{m}\sum_{i=1}^{m}\left(\frac{1}{n}\sum_{t=1}^{n}\left(\frac{\hat{y}_t - y_t}{y_t}\right)^2\right)$$

where $\hat{y}_t$ are the predictions of particular dates from the seasonal persistence model with selected lags and selected functions, $y_t$ are actual values of the historical load values from the particular dates, n is a number of data points in a forecast time period, and m is a number of iterations.

8. The method of claim 1, wherein the historical load values are for a week of load values.

9. The method of claim 1, wherein the forecast is provided to a display.

10. The method of claim 1, wherein the forecast is provided to a load controller.

11. A system comprising:
a processor,
a memory storage; and
instructions for adaptive persistence forecasting stored on the memory storage that when executed by the processor, direct the system to:
receive historical load values for a site comprising at least one component that consumes energy;
receive historical temperature values corresponding to dates of the historical load values;
evaluate the historical load values and the historical temperature values to determine a correlation coefficient;
determine that there exists at least a threshold correlation between a load activity and temperature for the historical load values and the historical temperature values based on the correlation coefficient;
normalize the historical load values based on a set temperature;
apply an adaptive seasonal persistence model to the normalized historical load values to output a forecast;
receive a temperature prediction;
generate a correction term using the temperature prediction and a correlation relationship between the historical load values and the historical temperature values identified when evaluating the historical load values and the historical temperature values;
apply the correction term to the forecast; and
provide the forecast for use in controlling energy resources at the site; and
control instructions stored on the memory storage that when executed by the processor, direct the system to:
receive the forecast; and
control the energy resources using the forecast.

12. The system of claim 11, wherein the system is a single board computer.

13. The system of claim 11, wherein the system is a programmable logic controller.

14. The system of claim 11, wherein the system further comprises a network interface;
wherein the instructions to receive the temperature prediction direct the system to:
communicate, via the network interface, with a weather application programming interface to obtain the temperature prediction.

15. The system of claim 11, wherein the correction term is given as:

$$\text{correction term} = \frac{f(t_{fi}) - f(t_{ref})}{f(t_{fi})}$$

where $t_{ref}$ is the set temperature, $t_{fi}$ is the temperature prediction and f( ) represents a best fitting line equation from the correlation relationship between the historical load values and the historical temperature values identified when evaluating the historical load values and the historical temperature values.

16. The system of claim 11, wherein the adaptive seasonal persistence model is given as:

$$P(t+\Delta t|t) = f(P(t-\delta_i t),$$

where $P(t+\Delta t|t)$ is the forecast for a time period $\Delta t$ made at time t, f represents a function used to summarize selected values from the historical load values, and $\delta_i$ are lag values for selecting past measurements from the historical load values.

17. The system of claim 11, wherein the instructions further direct the system to:
train the adaptive seasonal persistence model on the received historical load values by:
selecting a set of lag values;
selecting a function from a set of functions comprising mean, median, and mode;
generating a prediction for a particular date using the adaptive seasonal persistence model with selected set of lag values and selected function;
iterating the selecting of the set of lag values, selecting of the function, and generating the prediction for the particular date to generate a set of models; and
evaluating each model of the set of models using at least one error metric to identify an optimal seasonal persistence model, wherein the optimal seasonal persistence model is used as the adaptive seasonal persistence model when applying the adaptive seasonal persistence model to the normalized historical load values to output the forecast.

18. The system of claim 17, wherein the at least one error metric is selected from the group consisting of:
mean absolute percentage error (MAPE),
root mean square percentage error (RMSPE), and
mean square percentage error (MSPE), where $$MAPE = \frac{1}{m}\sum_{i=1}^{m}\left(\frac{1}{n}\sum_{t=1}^{n}\frac{|\hat{y}_t - y_t|}{y_t}\right)$$

$$RMSPE = \frac{1}{m}\sum_{i=1}^{m}\left(\sqrt{\frac{1}{n}\sum_{t=1}^{n}\left(\frac{\hat{y}_t - y_t}{y_t}\right)^2}\right)$$

-continued
$$MSPE = \frac{1}{m}\sum_{i=1}^{m}\left(\frac{1}{n}\sum_{t=1}^{n}\left(\frac{\hat{y}_t - y_t}{y_t}\right)^2\right)$$

where $\hat{y}_t$ are the predictions of particular dates from the seasonal persistence model with selected lags and selected functions, $y_t$ are actual values of the historical load values from the particular dates, n is a number of data points in a forecast time period, and m is a number of iterations.

* * * * *